July 22, 1924.
F. T. VANATTA
Re. 15,879
SIGNAL
Original Filed March 15, 1916 3 Sheets-Sheet 1
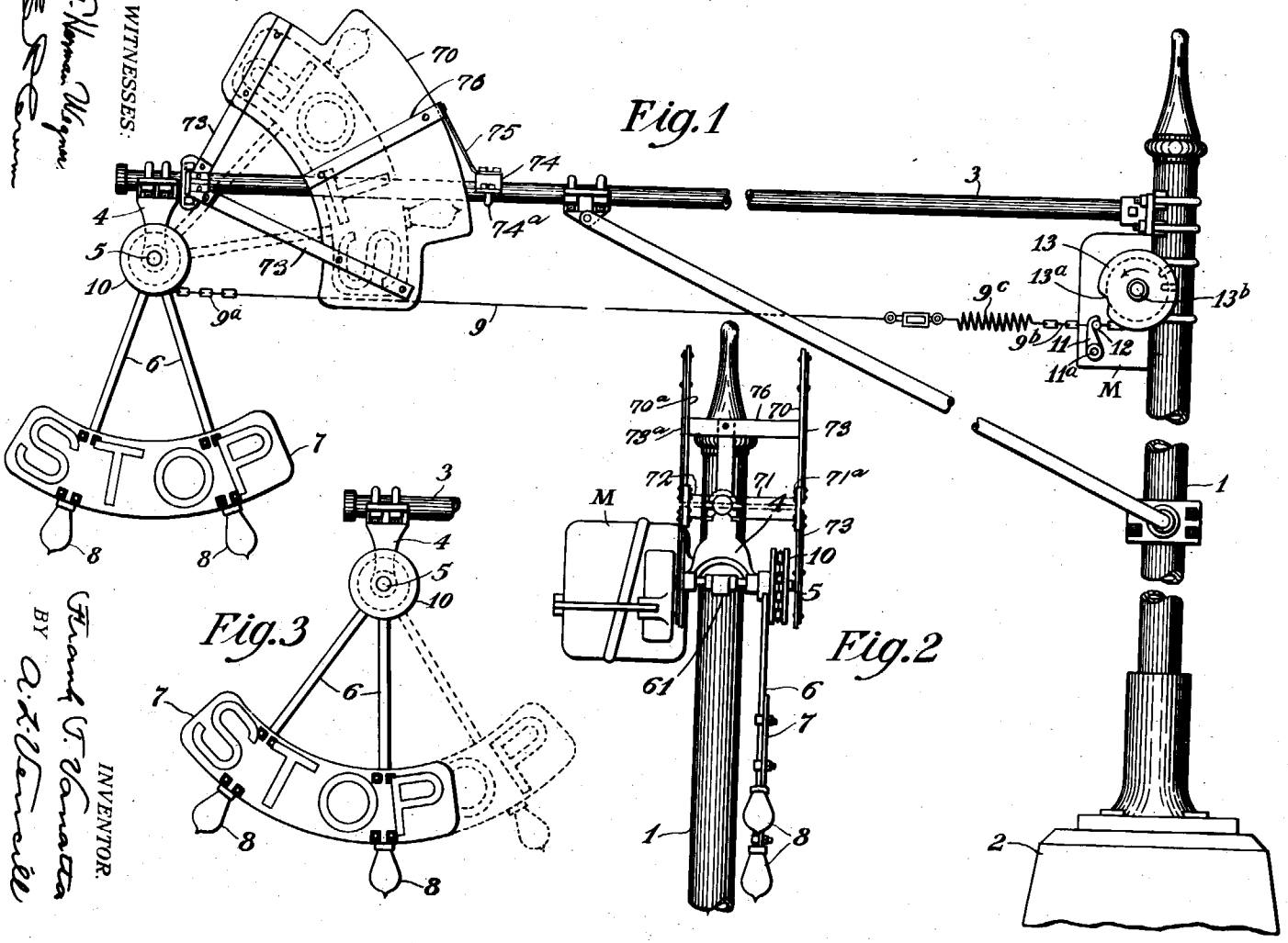
WITNESSES:
A. Herman Wagner
E. R. Crum
INVENTOR.
Frank T. Vanatta
BY A. L. Vennell
His ATTORNEY.

July 22, 1924.

F. T. VANATTA

Re. 15,879

SIGNAL

Original Filed March 15, 1916

3 Sheets-Sheet 2

WITNESSES:

A. Herman Wagner

E. R. Brown

INVENTOR.

Frank T. Vanatta

BY

A. R. Kenrall

His ATTORNEY.

July 22, 1924.

F. T. VANATTA

Re. 15,879

SIGNAL

Original Filed March 15, 1916 3 Sheets-Sheet 3

WITNESSES:

A. Herman Wegner

E. R. Corum

INVENTOR.

Frank T. Vanatta

BY A. L. Vencill

His ATTORNEY.

Reissued July 22, 1924.

Re. 15,879

UNITED STATES PATENT OFFICE.

FRANK T. VANATTA, OF MILL VALLEY, CALIFORNIA, ASSIGNOR TO THE UNION SWITCH & SIGNAL COMPANY, OF SWISSVALE, PENNSYLVANIA, A CORPORATION OF PENNSYLVANIA.

SIGNAL.

Original No. 1,255,959, dated February 12, 1918, Serial No. 84,332, filed March 15, 1916. Application for reissue filed April 20, 1918. Serial No. 229,866.

*To all whom it may concern:*

Be it known that I, FRANK T. VANATTA, a citizen of the United States, residing at Mill Valley, in the county of Marin and State of California, have invented certain new and useful Improvements in Signals, of which the following is a specification.

My invention relates to signals, and particularly to signals for use at grade crossings of railways and highways for the purpose of warning pedestrians and occupants of vehicles traveling on the highway of the approach of trains.

One object of my invention is the provision of a signal of this character which comprises a warning member, such as a semaphore, biased to occupy one position, which semaphore is held in another position when no train is approaching and the signal and controlling apparatus are in proper working condition, and which semaphore is caused to oscillate or "wag" to give a warning indication upon the approach of a train. The signal will therefore give one warning indication when a train is approaching and all parts are in proper operative condition, and another and distinctive warning indication when any part of the signal or its controlling apparatus is out of order regardless of whether or not a train is approaching.

I will describe one form of signal embodying my invention, and will then point out the novel features thereof in claims.

Figure 4:
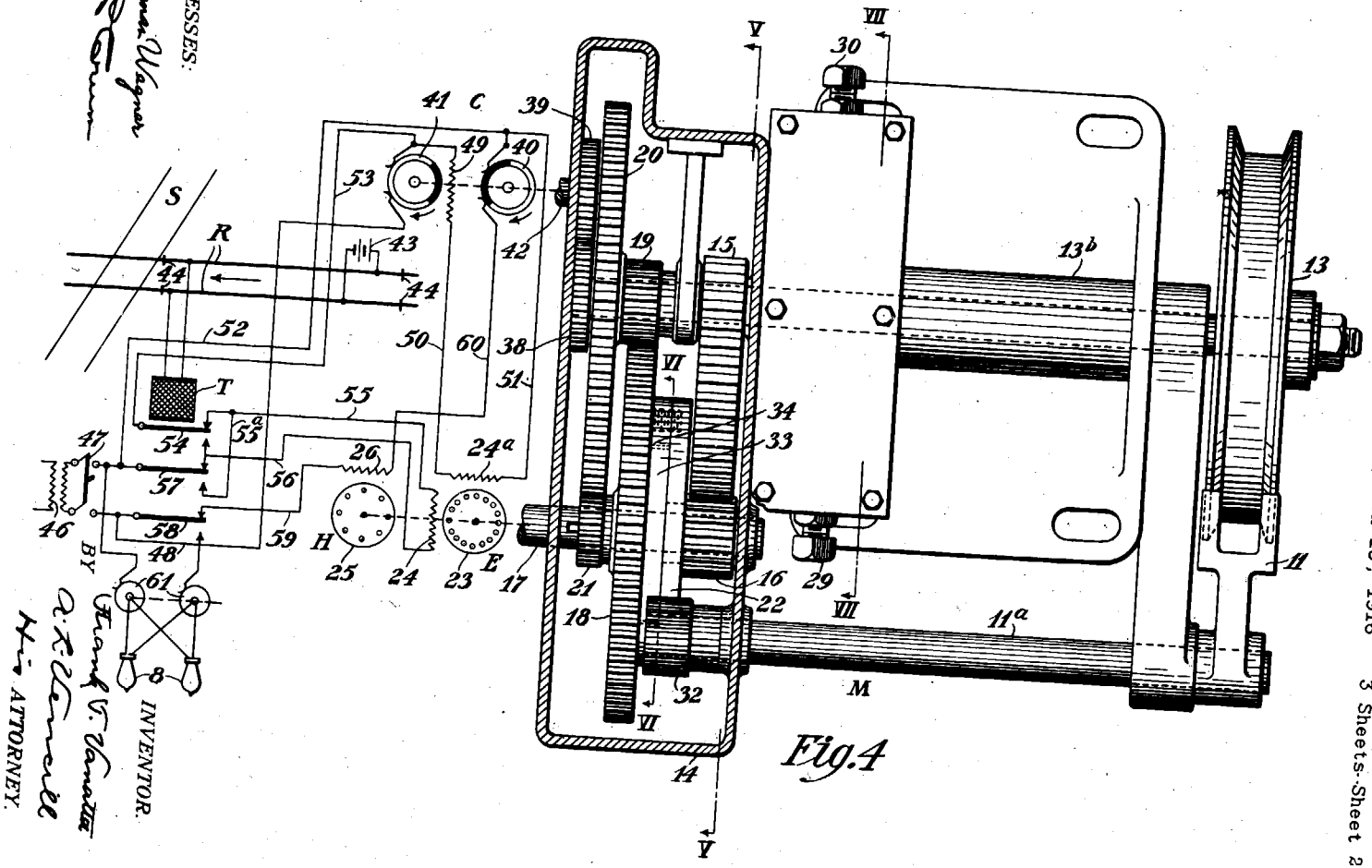
Figure 5:
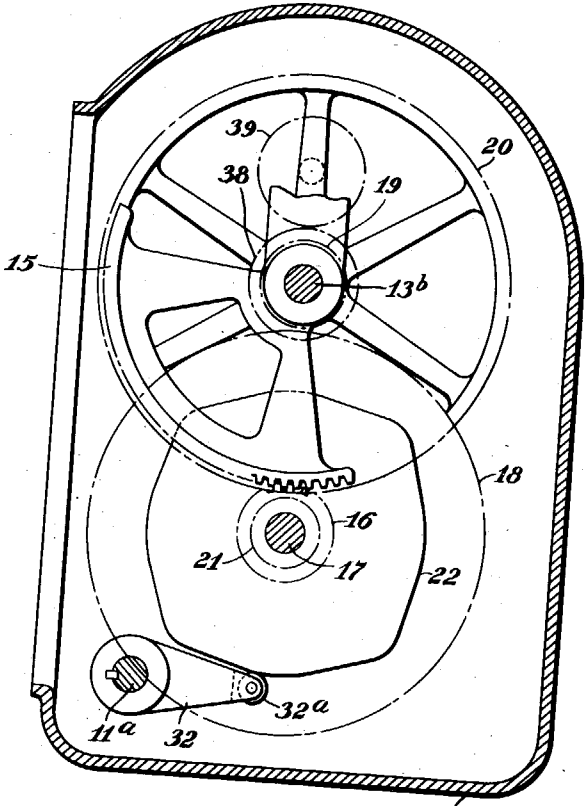
Figure 6:
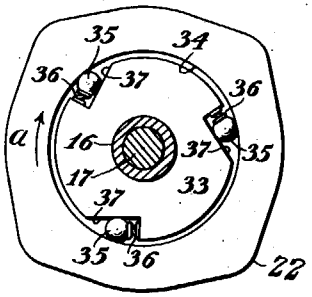
Figure 7:
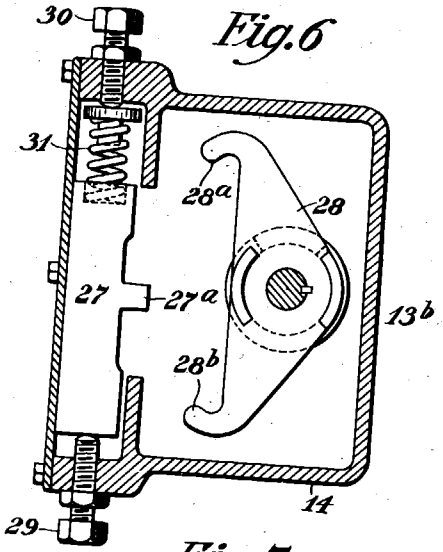

In the accompanying drawings, Fig. 1 is a view showing in front elevation one form of signal embodying my invention. Fig. 2 is an end view of the devices which are mounted on the free end of the arm 3 in Fig. 1. Fig. 3 is a fragmental view showing the range of movement of the warning member itself while the said member is giving the warning indication due to the approach of a train. Fig. 4 is a view partly in elevation, partly in section and partly diagrammatic, showing the mechanism M and also one form and arrangement of controlling apparatus and circuits for the signal. Fig. 5 is a sectional view on the line V—V of Fig. 4 looking in the direction of the arrows. Fig. 6 is a sectional view on the line VI—VI of Fig. 4 looking in the direction of the arrows. Fig. 7 is a sectional view on the line VII—VII of Fig. 4, looking in the direction of the arrows.

Similar reference characters refer to similar parts in each of the several views.

Referring first to Fig. 1, the signal in the form here shown comprises a post or mast 1 mounted on a base or foundation 2 located at the side of the highway near the crossing of the highway and the railway. This post or mast 1 carries an arm 3 which projects across the highway so that the warning devices mounted on this arm near its outer end are located over substantially the middle of the highway where they can be plainly seen by pedestrians or occupants of vehicles using the highway.

Attached to the arm 3 near its outer end is a depending forked bracket 4 (see Figs. 1 and 2), the two arms of the fork constituting bearings in which a shaft 5 is mounted to oscillate. This shaft carries a pendulum-like device comprising a semaphore 7 and radial rods 6 which are rigidly attached to the shaft 5. The semaphore 7 constitutes the warning device of the signal, that is, the device which by its position or movement indicates to a traveler on the highway whether or not it is safe to cross the railway track. This semaphore is referred to more broadly hereinafter in the claims as a "member mounted to oscillate". The semaphore 7 preferably has a warning legend, such as the word "stop", inscribed thereon as indicated in Fig. 1, such legend generally appearing on both sides of the semaphore, and the semaphore also preferably carries one or more electric lamps 8 for giving a warning at night.

The arm 3 carries two shields 70 and $70^a$ so located as to obscure the semaphore 7 when the latter is in the position indicating that no train is approaching. As here shown, these shields are supported by a clamp comprising two members 71 and 72. Member 71 is provided with two flanges $71^a$ to which are bolted two arms 73 which in turn support the shield 70. Clamp member 72 is provided with similar flanges to which are attached arms $73^a$ and which in turn support the shield $70^a$. A further support for the shields is provided in the form of a second clamp 74—74ᵃ which carries an arm 75. The upper end of this arm is attached to a U-shaped strap 76, and the legs of this strap are secured to the two shields 70 and 70ᵃ. The two shields are so located that the semaphore 7 passes between them.

The semaphore 7 is controlled by a flexible connector 9, preferably a wire, one end of which terminates in a short length of chain 9ᵃ which passes over and is attached to a grooved wheel 10, which wheel is rigidly attached to the shaft 5. As here shown, the radial rods 6 which carry the semaphore 7 are mounted in a hub integral with the wheel 10. It will be seen that by pulling the connecting wire 9 to the right as viewed in Fig. 1, the semaphore 7 will be drawn away from the vertical position to which it is biased by gravity.

The other end of the wire terminates in a chain 9ᵇ which passes over and is attached to a grooved wheel 13 operated in a manner hereinafter described. Interposed in the connection between the wire 9 and the chain 9ᵇ is a spring 9ᶜ the function of which is to absorb shocks as hereinafter explained. The chain 9ᵇ is provided with trunnions 12 projecting from opposite sides thereof and adapted to be engaged by a forked jaw 11 which is fixed to a shaft 11ᵃ and is oscillated about this shaft as a center at times as will hereinafter appear. The wheel 13 and the jaw 11 are actuated in the desired manner by means of an operating mechanism M which I will describe hereinafter.

The operation of the signal as thus set forth is as follows: When the semaphore 7 is not acted upon by any force other than gravity, it hangs in the vertical position, which is the position in which it is shown in full lines in Fig. 1. If while in this position, the wheel 13 is turned in the direction indicated by the arrow thereon, the semaphore 7 will be swung in opposition to the force of gravity into a position such as that indicated in dash lines in Fig. 1, wherein it is obscured by the shields 70 and 70ᵃ. This is what I will term the "proceed" position, that is, the position in which the signal indicates that no train is approaching and that therefore a traveler on the highway may proceed across the railway track in safety. As the wheel 13 turns to wind the chain 9ᵇ thereon, the trunnions 12 fit into recesses 13ᵃ cut into the rims of the wheel so that the chain is not raised out of the groove in this wheel. Assume now that when the semaphore 7 is in the upper or "proceed" position, the wheel 13 is released and the forked jaw 11 is caused to oscillate. This jaw, acting on the trunnions 12, will exert intermittent pulls to the right on wire 9 and so will cause the semaphore 7 to oscillate through a suitable angle on opposite sides of its vertical position; the limits of this oscillation may be as indicated by the full and the dash lines in Fig. 3. This oscillation of the semaphore constitutes what I will term the "stop" or "danger" indication, that is, it conveys to a traveler on the highway the information that a train is approaching and that it is therefore dangerous to cross the track. The period of oscillation of the jaw 11 is preferably the same as the natural period of oscillation of the semaphore 7.

Referring now to Figs. 4, 5, 6 and 7, I will explain the structure and operation of the mechanism M by means of which the desired operations of the wheel 13 and the jaw 11 are accomplished.

The mechanism comprises an inclosing casing and framework 14 in which is journaled a shaft 13ᵇ to which the wheel 13 is rigidly attached. At the inner end of this shaft, and rigidly attached thereto is a segmental gear 15 which meshes with a pinion 16 freely mounted on a shaft 17 which also is journaled in the framework 14. This pinion 16 is operatively connected at times, through a directional clutch as will be hereinafter explained, with a gear 18 also mounted to rotate freely on the shaft 17. Meshing with the gear 18 is a pinion 19 which is integral with a gear 20 and both of which are mounted to rotate freely on the shaft 13ᵇ. The gear 20 meshes with a pinion 21 which is rigidly attached to the shaft 17.

Operatively connected with the shaft 17 are an electric motor E and a holding device H, both of which are shown diagrammatically in Fig. 4 for the sake of simplicity. The motor E may be of any desired type; as here shown it is a two phase induction motor comprising a rotor 23 attached to shaft 17 and two stator windings 24 and 24ᵃ. The holding device H may be of any desired type, and as here shown it is similar to the device disclosed in United States Letters Patent No. 1170360, granted to John D. Taylor on February 1, 1916; this device comprises a rotor member 25 operatively connected with the shaft 17, and an energizing winding 26. It is understood, however, that any desired type of holding device may be employed, the essential thing being that when this device is energized it shall resist the torque exerted on the shaft 17 by the warning semaphore 7 when the latter occupies the position in which it is shown in dotted lines in Fig. 1, and that when the device is de-energized it shall permit free rotation of the shaft 17.

The angle of oscillation of the wheel 13 is limited by a stop device as shown in Fig. 7. This device comprises a member 28 fixed to shaft 13ᵇ and provided with two wings adapted to engage a shoulder 27ᵃ formed on a block 27. This block is mounted to slide in suitable guides formed in the casing 14, and its downward movement is limited by a screw 29. The upward movement of this block is limited by another screw 30 between which and the block is a shock-absorbing spring 31.

The forked jaw 11 is fixed to a shaft $11^a$ as hereinbefore stated, and this shaft is mounted to oscillate in suitable bearings in the frame 14 as shown in Fig. 4. Fixed to this shaft at its inner end is a crank arm 32 (see Fig. 5) in which is journaled a roller $32^a$ which coacts with a cam 22 attached to the face of the gear 18 and shaped substantially as shown in Fig. 5. Rotation of this cam therefore causes oscillation of the jaw 11 which in turn causes oscillation of the semaphore 7 as hereinbefore described.

It has already been pointed out that the gear 18 and the pinion 16 are connected by means of a directional clutch. Referring to Figs. 4 and 6, this clutch as here shown is of the ball type, comprising a circular disk 33 integral with the pinion 16, which disk is located in a cylindrical recess 34 in the cam 22. The surface of the disk 33 is provided with triangular notches 37 in which are located balls 35, and these balls are pushed into wedging position by springs 36 in the usual and well known manner. It will be seen therefore that when the cam 22 is rotated in the direction of the arrow *a* in Fig. 6 the clutch is operative to drive the pinion 16 and the wheel 13 is then turned in such direction as to raise the banner 7 to the dash line position in Fig. 1; but when the cam 22 is rotated in the opposite direction the clutch becomes inoperative so that no torque is transmitted to the wheel 13.

Operatively connected with the shaft $13^b$ is a circuit controller C comprising two rotatable contact segments 40 and 41 co-operating with fixed contact fingers as shown in Fig. 4. These contact segments are attached to a shaft 42 to which is fixed a gear 39, and this gear meshes with another gear 38 attached to the end of shaft $13^b$.

In Fig. 4 I have shown a portion of a railway track R over which traffic moves in the direction of the arrow, and crossing this track at grade is a highway or street S. A portion of the track to the right of the highway crossing is divided into an insulated track section by insulated joints 44, and the rails of this section form part of a track circuit which comprises also a battery 43 connected across the rails near one end of the section and a track relay T connected across the rails near the other end of the section.

The motor E and holding device H are operated by alternating current from a suitable source which as here shown is a transformer 46, and the supply of current to these devices is controlled by the track relay T and the circuit controller C. I have also shown a hand switch 47 for disconnecting the transformer from the signal when desired.

The operation of the signal as a whole is as follows:

I will first assume that the track circuit is unoccupied and that the hand switch 47 is open as shown in Fig. 4. The motor E and holding device H are then de-energized, so that the parts of the mechanism M are in the position in which they are shown in Figs. 4 and 5, and the semaphore 7 hangs vertically as shown in Fig. 1. If now the track section remains unoccupied and hand switch 47 is closed, the windings of motor E will become energized; the circuit for winding $24^a$ is from secondary of transformer 46 through wire 48, contact segment 41, reactance 49, wire 50, winding $24^a$, wire 51, wire 52 to transformer 46; the circuit for winding 24 is from secondary of transformer 46 through wire 48, segment 41, wire 53, upper point of relay contact 54, wire 55, winding 24, wire 56, upper point of relay contact 57 to transformer 46. The currents in the two windings of motor E are displaced in phase by the reactance 49, and the phases in these two windings are in such relation as to cause the motor to drive the gear 18 (through the medium of gears 21, 20 and 19) in the direction indicated by the arrow *a* in Fig. 6. The clutch is then operative to connect gear 18 and pinion 16, so that wheel 13 is turned in such direction as to draw the semaphore 7 to the right as viewed in Fig. 1. When the semaphore reaches substantially the dash line position shown in Fig. 1, both motor winding circuits are opened by contact segment 41, and the circuit for the winding 26 of the holding device H is closed by segment 40. This latter circuit is from the secondary of transformer 46 through upper point of relay contact 58, wire 59, winding 26, wire 60, contact segment 40, and wire 52 to the transformer. The motor E therefore becomes deenergized, and the holding device H is energized to retain the semaphore in the upper or "proceed" position. The mechanical stop 28 prevents overrunning this position. While the semaphore is being drawn to the "proceed" position, the cam 22 is of course rotating. This does not, however, cause oscillation of the jaw 11; the jaw will merely be moved to its extreme right hand position as viewed in Fig. 1 and will remain there, there being no force to cause it to return as the cam recedes from its follower $32^a$. Oscillation of the jaw during this movement of the semaphore would do no harm, however, because soon after the semaphore leaves the vertical position the trunnions 12 move out of the path of the jaw 11.

I will now assume that the signal is in the proceed position and that a train enters the track circuit section, causing relay T to open. The opening of the upper point of relay contact 58 opens the circuit for the holding device H so that the semaphore begins to fall by gravity, thus causing rotation of wheel 13 and the entire train of gears in the direction opposite to that in which these parts moved while driving the signal to the proceed position. A very slight movement of the parts is sufficient to close contact 41, whereupon the motor E again becomes energized. The circuit for the motor winding 24[a] is the same as before, but the circuit for winding 24 is now from the lower transformer secondary terminal through wire 48, contact 41, wire 53, lower point of relay contact 54, wire 56, winding 24, wire 55, wire 55[a], lower point of relay contact 57 to the upper terminal of the transformer secondary. The connection of winding 24 with the transformer secondary is thus reversed, hence the direction of rotation of motor E is reversed. Gear 18 now rotates in the opposite direction and therefore does not drive pinion 16. As soon as the semaphore falls to such point that the trunnions 12 engage the jaw 11 this jaw begins to exert periodic pulls on wire 9, and the semaphore is then caused to oscillate or "wag" through substantially the angle indicated in Fig. 3, thus giving the danger or "stop," indication. As soon as the entire train has passed the highway S, relay T becomes energized and the direction of rotation of the motor is reversed, thus causing the semaphore 7 to be again swung to and held in its "proceed" position.

Attached to the shaft 5 (Fig. 2) are two contact rings 61 (see also Fig. 4) to which the lamps 8 are electrically connected; and bearing on these rings are two fixed brushes, one of which is connected directly to the upper transformer secondary terminal and the other of which is connected with the lower secondary terminal through the lower point of relay contact 58. Hence as long as the track relay T is energized the lamps 8 are extinguished, but when a train approaches and causes de-energization of the relay so that the banner 7 is caused to oscillate, the lamps become illuminated.

It will be observed that in case of failure or breakage of any part of the mechanism between the wheel 10 and the holding device H, the semaphore 7 will fall to the vertical position, thus indicating to a traveler on the highway that the signal is out of order and that he must rely entirely on his own senses to cross the railway in safety. The same result follows in case of failure of the source of current supply for the signal.

Although I have herein shown and described only one form of signal embodying my invention, it is understood that various changes and modifications may be made therein within the scope of the appended claims without departing from the spirit and scope of my invention.

Having thus described my invention, what I claim is:

1. A railway crossing signal comprising a pendulum-like warning member mounted to oscillate, electromagnetic means for causing said member to swing to and fro continuously, and electromagnetic means for holding said member in an inclined position.

2. A railway crossing signal comprising a a pendulum-like warning member mounted to oscillate, electromagnetic means for causing said member to swing to and fro continuously to indicate danger, and electromagnetic means for holding said member in an inclined position to indicate safety.

3. A railway crossing signal comprising a pendulum-like warning member mounted to oscillate, electromagnetic means adapted when energized to cause said member to swing to and fro continuously, and other electromagnetic means adapted when energized to hold said member in an inclined position.

4. A signal comprising a warning member mounted to oscillate and biased to one indicating position, an electric motor, means operated by said motor during rotation in one direction for moving said member against its biasing force to another indicating position, and means operated by said motor during rotation in the other direction for causing oscillation of said member.

5. A railway crossing signal comprising a pendulum-like warning member mounted to oscillate, means for causing continuous swinging of said member, electromagnetic means for operating said first-mentioned means, and electro-magnetic means for holding said member in an inclined position.

6. A railway crossing signal comprising a pendulum-like warning member mounted to oscillate, an electric motor having a member which rotates when the motor is energized, means operated by said motor member for causing said warning member to swing to and fro continuously, and electromagnetic means for holding said warning member in an inclined position.

7. A signal comprising a warning member mounted to oscillate and biased to one indicating position, an actuating connector operatively connected with said member and adapted to swing the member away from its biased position, means for exerting a steady force on said connector to move the member to and hold in in another indicating position in opposition to its bias, a trunnion fixed to said connector, a jaw mounted to oscillate in operative relation to said trunnion, and electrical means for operating said first-mentioned means and for causing oscillation of said jaw.

8. A railway crossing signal comprising a pendulum-like warning member biased to an intermediate position wherein it gives a warning indication, means for causing continuous oscillation of said member to give an indication of danger, and means for holding said member in an inclined position wherein it gives a safety indication.

9. A railway crossing signal comprising a warning member mounted to oscillate, electromagnetic means for causing said member to swing to and fro continuously to give a danger indication, and electromagnetic means for holding said member in a position to indicate safety.

10. A railway crossing signal comprising a warning member mounted to oscillate, electromagnetic means for causing said member to swing to and fro continuously to give a danger indication, and for moving said member to a position indicating safety, and electromagnetic means for holding said member in the safety position.

11. In a signal apparatus of the character set forth, the combination with a movable signal member, of a motor for operating it, a mechanism for controlling the actuation of the operating motor, and means for continuing the operation of the motor to move the signal member to and secure its stoppage at a predetermined position after the controlling mechanism is operated to stop the actuation of the operating motor.

12. In a signal apparatus of the character set forth, the combination with a movable signal member, of a motor for operating it, and mechanism for controlling the movement of the signal member, including means for throwing the operating motor into and out of action, and means for continuing the action of the operating motor when the first means is inactive, to continue the movement of the signal by the motor to a predetermined position.

13. In a signal apparatus of the character set forth, the combination with a movable signal member, of means for operating it, and mechanism for controlling the movement of the signal member by said means, including means for throwing the operating means into and out of action, and means controlled by the signal operating means for continuing the action of the operating means when the first controlling means is inactive to continue the movement of the signal to a predetermined position and stopping the action of the operating means as soon as said position is reached.

14. In a signal apparatus of the character set forth, the combination with a swinging signal member, of an electric motor for effecting an automatic continuous swinging movement thereof, electrical means for actuating the motor comprising two circuits that include said motor, means independent of the motor for controlling one of the circuits without affecting the other, and means operated by the motor for controlling the other circuit.

15. In signal apparatus of the character set forth, the combination with a movable signal member, of an electric motor for actuating the same, and electrical means for controlling the operation of the motor, including separate circuits including the motor, and controlling devices for the respective circuits, one of which is actuated by the motor and the other being capable of actuation independently of said motor.

16. In signal apparatus of the character set forth, the combination with a signal member movable to and from a predetermined inactive position, of an electric motor for actuating the same, a circuit including the electric motor, a controller for said circuit independent of the motor, another circuit including the motor, a controller for the second circuit, and means actuated by said motor to operate the controller of the second circuit when the signal member approaches its said predetermined inactive position.

17. A signal comprising a pendulum, electromagnetic means for causing said pendulum to swing to and fro continuously, means for retaining said pendulum in substantially one extreme position of its stroke, and means operatively connected with said pendulum for de-energizing said swinging means before the pendulum reaches the said extreme position.

18. A signal comprising a pendulum, electromagnetic means for causing said pendulum to swing to and fro continuously, and other electromagnetic means adapted when energized to arrest said pendulum and hold it in an inclined position.

19. A signal comprising a pendulum, electromagnetic means for causing said pendulum to swing to and fro continuously, means for retaining said pendulum in an inclined position, and means operatively connected with said pendulum for de-energizing said swinging means before the pendulum reaches the said inclined position.

20. A signal comprising a pendulum-like warning member, and electrically controlled means for causing said member to oscillate continuously to give one indication and for retaining said member in a given position to give a different indication.

21. A crossing signal comprising a pendulum semaphore, a motor for causing said semaphore to oscillate, a circuit for energizing said motor, controlling means for opening and closing said circuit, and means for continuing the energization of said motor after said controlling means has been opened until the semaphore reaches a predetermined inclined position.

22. In a railway crossing signal, a swinging visible signal member; a source of electricity; an electric motor operated by current from said source and operatively connected with said signal member and adapted to swing the same a plurality of times; means for causing said motor to operate said signal member; and means for moving said signal member into a position other than its normal initial position upon a failure of said source of electricity.

23. In a railway crossing signal, a swinging visible signal member; a source of electricity; a normally inoperative electric motor operated by current from said source and operatively connected with said signal member and adapted to swing the same a plurality of times; electrically operated means for closing a circuit in which said motor is included to thereby operate said signal member; and means for moving said signal member into a position other than its normal initial position upon a failure of said source of electricity.

24. In a railway crossing signal, a swinging visible signal member; a source of electricity; a normally inoperative electric motor operated by current from said source and operatively connected with said signal member and adapted to swing the same a plurality of times; means for controlling the flow of electricity to said motor; and means whereby said signal member is caused to move into a position other than its normal initial position upon a failure of said source of electricity.

25. In a railway crossing signal, a swinging visible signal member; a normally inoperative electric motor operatively connected with said signal member and adapted to swing the same a plurality of times; a main circuit in which said motor is included and through which current is supplied thereto; an auxiliary circuit through which current may flow to said motor to thereby continue the operation thereof after said main circuit has been broken; circuit controlling means adapted to close said main circuit and open said auxiliary circuit, and to open said main circuit and close said auxiliary circuit; a source of electricity adapted to supply current to said circuits; means for operating said circuit controlling means; and means for automatically breaking said auxiliary circuit when said signal member has been returned to its initial position.

26. In a railway crossing signal, a swinging visible signal member; a normally inoperative electric motor operatively connected with said signal member and adapted to swing the same a plurality of times; a main circuit in which said motor is included and through which current is supplied thereto; an auxiliary circuit through which current may flow to said motor to thereby continue the operation thereof after said main circuit has been broken; circuit controlling means adapted to control said main and auxiliary circuits; a source of electricity for supplying current to said circuits; means for operating said circuit controlling means; and means for automatically breaking said auxiliary circuit when said signal member has been returned to its initial position.

27. In a railway crossing signal, a swinging visible signal member; a normally inoperative electric motor operatively connected with said signal member and adapted to swing the same a plurality of times; a source of electricity; a circuit in which said motor is included and through which current is supplied thereto; circuit controlling means included in said circuit and adapted to make and break the same; electrically operated means for operating said circuit controlling means; and electromagnetic means energized by current derived from said source for holding said signal member in its normal initial position.

28. In a railway crossing signal, a swinging visible signal member so arranged that it may be moved by gravity when it is in its normal initial position; a normally inoperative electric motor operatively connected with said signal member and adapted to swing the same a plurality of times; a source of electricity; a circuit in which said motor is included and through which current is supplied thereto; circuit controlling means included in said circuit and adapted to make and break the same; electrically operated means for operating said circuit controlling means; and electromagnetic means energized by current derived from said source for holding said signal member in its normal initial position.

29. In a railway crossing signal, a swinging visible signal member so arranged that it may be moved by gravity when it is in its normal initial position; a normally inoperative electric motor operatively connected with said signal member and adapted to swing the same a plurality of times; a source of electricity; a circuit in which said motor is included and through which current is supplied thereto; circuit controlling means included in said circuit and adapted to make and break the same; electrically operated means for operating said circuit controlling means; means whereby said signal member is hidden from view when in its normal initial position; and electromagnetic means energized by current derived from said source for holding said signal member in its normal initial position.

30. In a railway crossing signal, a swinging visible signal member so arranged that it may be moved by gravity when it is in its normal initial position; a normally inoperative electric motor operatively connected with said signal member and adapted to swing the same a plurality of times; a main circuit in which said motor is included and through which current is supplied thereto; an auxiliary circuit through which current may flow to said motor to thereby continue the operation thereof after said main circuit has been broken; circuit controlling means adapted to close said main circuit and open said auxiliary circuit, and to open said main circuit and close said auxiliary circuit; a source of electricity adapted to supply current to said circuits; means for operating said circuit controlling means; means for automatically breaking said auxiliary circuit when said signal member has been restored to its initial position; and electromagnetic means energized by current derived from said source for holding said signal member in its normal initial position.

31. In a railway crossing signal, a swinging visible signal member so arranged that it may be moved by gravity when it is in its normal initial position; means whereby said signal member is hidden from view when in its normal initial position; a normally inoperative electric motor operatively connected with said signal member and adapted to swing the same a plurality of times; a main circuit in which said motor is included and through which current is supplied thereto; an auxiliary circuit through which current may flow to said motor to thereby continue the operation thereof after said main circuit has been broken; circuit controlling means adapted to close said main circuit and open said auxiliary circuit, and to open said main circuit and close said auxiliary circuit; a source of electricity adapted to supply current to said circuits; means for operating said circuit controlling means; means for automatically breaking said auxiliary circuit when said signal member has been restored to its initial position; and electromagnetic means energized by current derived from said source for holding said signal member in its normal initial position.

32. A railway crossing signal comprising a pendulum-like warning member mounted to oscillate, electromagnetic means for causing said member to swing to and fro continuously, electromagnetic means for holding said member in an inclined position, and means for obscuring said member when in inclined position.

33. A railway crossing signal comprising a pendulum-like warning member mounted to oscillate, electromagnetic means adapted to swing to and fro continuously, other electromagnetic means adapted when energized to hold said member in an inclined position, and means for obscuring said member when in inclined position.

34. A railway crossing signal comprising a pendulum-like warning member mounted to oscillate, means for causing continuous swinging of said member, electromagnetic means for operating said first-mentioned means, electromagnetic means for holding said member in an inclined position, and means for obscuring said member when in inclined position.

35. A railway crossing signal comprising a pendulum-like warning member mounted to oscillate, an electric motor having a member which rotates when the motor is energized, means operated by said motor member for causing said warning member to swing to and fro continuously, electromagnetic means for holding said warning member in an inclined position, and means for obscuring said member when in inclined position.

36. A railway crossing signal comprising a member biased to one position, indicating a defect; means for continuously oscillating the member, indicating danger, and means for moving the member to and holding it in a hidden position, indicating safety.

37. In combination, a section of railway track, a track circuit therefor including a track relay having a front and a back contact, a highway crossing signaling apparatus comprising a pendulum semaphore and a holding device for latching said semaphore in an inclined position; an electric lamp carried by said semaphore, means for controlling said holding device by the front contact of said relay, and means for controlling said lamp by the back contact of said relay.

In testimony whereof I affix my signature in presence of two witnesses.

FRANK T. VANATTA.

Witnesses:

PAUL HELMORE,

J. B. STRUBLE.